(12) United States Patent
Caretta et al.

(10) Patent No.: US 8,460,590 B2
(45) Date of Patent: Jun. 11, 2013

(54) PROCESS FOR CONTINUOUSLY PRODUCING AN ELASTOMERIC COMPOSITION

(75) Inventors: Renato Caretta, Gallarate (IT); Maurizio Galimberti, Milan (IT); Cesare Amurri, Sesto San Giovanni (IT); Cristiano Puppi, Guanzate (IT); Giuseppe Ducoli, Castellanza (IT); Enrico Albizzati, Lesa (IT)

(73) Assignee: Pirelli Pneumatici S.p.A., Milan (IT)

( * ) Notice: Subject to any disclaimer, the term of this patent is extended or adjusted under 35 U.S.C. 154(b) by 1443 days.

(21) Appl. No.: 10/484,494
(22) PCT Filed: Jul. 22, 2002
(86) PCT No.: PCT/EP02/08145
§ 371 (c)(1), (2), (4) Date: Jul. 28, 2004
(87) PCT Pub. No.: WO03/009989
PCT Pub. Date: Feb. 6, 2003

(65) Prior Publication Data
US 2005/0087906 A1    Apr. 28, 2005

Related U.S. Application Data

(60) Provisional application No. 60/309,166, filed on Aug. 2, 2001.

(30) Foreign Application Priority Data

Jul. 25, 2001 (EP) .................................. 01117993

(51) Int. Cl.
*B28B 3/20* (2006.01)
*D01F 1/02* (2006.01)
*B29C 47/38* (2006.01)

(52) U.S. Cl.
USPC ............... 264/211.23; 264/211; 264/211.21; 264/211.24; 264/176.1

(58) Field of Classification Search
USPC ............ 262/174.11, 211.21, 211.23, 211.24; 264/37.3, 37.32, 176.1, 211, 211.21, 211.23, 264/113, 131.1; 425/197, 198
See application file for complete search history.

(56) References Cited

U.S. PATENT DOCUMENTS

| 3,352,952 A | 11/1967 | Marr |
| 3,816,358 A | 6/1974 | Nordsiek et al. |

(Continued)

FOREIGN PATENT DOCUMENTS

| DE | 1 439 247 | 6/1976 |
| DE | 32 12 643 A1 | 10/1983 |

(Continued)

OTHER PUBLICATIONS

Conair Autocolor Userguide [online]. The Conair Group, Inc [retrieved on Jan. 15, 2010]. Retrieved from the Internet: <URL:http://www.conairnet.com/Archive%20Manuals/Blending/Autocolor.pdf>.*

(Continued)

*Primary Examiner* — Christina Johnson
*Assistant Examiner* — Patrick Butler
(74) *Attorney, Agent, or Firm* — Finnegan, Henderson, Farabow, Garrett & Dunner, L.L.P.

(57) ABSTRACT

A process for continuously producing an elastomeric composition includes providing at least one extruder, metering and feeding at least one elastomer, at least one filler, and ingredients different from elastomers and fillers into the at least one extruder, mixing and dispersing the at least one filler and the ingredients different from elastomers and fillers into the at least one elastomer using the at least one extruder, and extruding a resulting elastomeric composition. The at least one extruder includes the housing and at least one screw rotatably mounted in the housing. The housing includes at least one feed opening and a discharge opening. At least one of the ingredients different from elastomers and fillers includes a subdivided product including one or more minor ingredients dispersed in at least one thermoplastic binding agent. An apparatus for continuously producing the elastomeric composition is also disclosed.

17 Claims, 2 Drawing Sheets

U.S. PATENT DOCUMENTS

| | | | |
|---|---|---|---|
| 4,092,285 A | | 5/1978 | Leo et al. |
| 4,153,772 A | | 5/1979 | Schwesig et al. |
| 4,197,381 A | * | 4/1980 | Alia ............................ 525/222 |
| 4,422,810 A | | 12/1983 | Boring |
| 4,550,142 A | | 10/1985 | Akita et al. |
| 4,670,181 A | | 6/1987 | Mollinger et al. |
| 4,675,349 A | | 6/1987 | Palombo et al. |
| 4,680,330 A | | 7/1987 | Berrier et al. |
| 4,708,617 A | | 11/1987 | Herrington |
| 4,742,124 A | | 5/1988 | Tsutsumi et al. |
| 4,768,937 A | | 9/1988 | Singh |
| 4,804,510 A | * | 2/1989 | Luecke et al. ................ 264/169 |
| 4,872,822 A | | 10/1989 | Pizzorono |
| 4,886,850 A | | 12/1989 | Ogawa et al. |
| 4,895,692 A | | 1/1990 | Laurent et al. |
| 4,897,236 A | | 1/1990 | Rabiger et al. |
| 4,962,262 A | | 10/1990 | Winter et al. |
| 4,973,627 A | | 11/1990 | Mitchell |
| 5,008,204 A | | 4/1991 | Stehling |
| 5,036,132 A | | 7/1991 | Coran |
| 5,096,867 A | | 3/1992 | Canich |
| 5,118,773 A | | 6/1992 | Takao et al. |
| 5,158,725 A | | 10/1992 | Handa et al. |
| 5,227,425 A | | 7/1993 | Rauline |
| 5,229,478 A | | 7/1993 | Floyd et al. |
| 5,246,783 A | | 9/1993 | Spenadel et al. |
| 5,262,111 A | | 11/1993 | Capelle et al. |
| 5,272,236 A | | 12/1993 | Lai et al. |
| 5,302,635 A | | 4/1994 | Brinkmann et al. |
| 5,341,863 A | | 8/1994 | Sandstrom et al. |
| 5,374,387 A | | 12/1994 | Barnes et al. |
| 5,414,040 A | | 5/1995 | McKay et al. |
| 5,573,610 A | * | 11/1996 | Koch et al. ................. 152/152.1 |
| 5,593,747 A | | 1/1997 | Georgelos |
| 5,626,420 A | | 5/1997 | Deal et al. |
| 5,703,187 A | | 12/1997 | Timmers |
| 5,711,904 A | | 1/1998 | Eswaran et al. |
| 5,744,566 A | | 4/1998 | Tsutsui et al. |
| 5,969,070 A | * | 10/1999 | Waymouth et al. ............ 526/351 |
| 6,028,143 A | | 2/2000 | Mukai |
| 6,037,418 A | | 3/2000 | Mukai et al. |
| 6,046,287 A | | 4/2000 | Galimberti et al. |
| 6,068,694 A | | 5/2000 | Bernard et al. |
| 6,075,116 A | | 6/2000 | Moriwaki et al. |
| 6,135,180 A | | 10/2000 | Nohara |
| 6,207,746 B1 | | 3/2001 | Uchida et al. |
| 6,277,916 B1 | * | 8/2001 | Terbrueggen et al. ........... 525/95 |
| 6,315,019 B1 | | 11/2001 | Garlaschelli et al. |
| 6,325,956 B2 | * | 12/2001 | Chaudhary et al. .............. 264/50 |
| 6,380,341 B1 | * | 4/2002 | Waymouth et al. ......... 526/348.5 |
| 6,401,779 B1 | | 6/2002 | Riva et al. |
| 6,464,607 B1 | | 10/2002 | Rosenboom et al. |
| 6,550,508 B1 | | 4/2003 | Yamaguchi et al. |
| 6,566,432 B2 | | 5/2003 | Kawamura et al. |
| 7,014,922 B2 | | 3/2006 | Riva et al. |

FOREIGN PATENT DOCUMENTS

| | | |
|---|---|---|
| DE | 196 19 509 | 11/1997 |
| DE | 196 19 509 A1 | 11/1997 |
| EP | 0 035 342 A2 | 9/1981 |
| EP | 0 117 834 A1 | 9/1984 |
| EP | 0 129 368 A1 | 12/1984 |
| EP | 0 199 064 B1 | 10/1986 |
| EP | 0 206 794 A1 | 12/1986 |
| EP | 0 242 840 A1 | 10/1987 |
| EP | 0 277 003 A1 | 8/1988 |
| EP | 0 277 004 A1 | 8/1988 |
| EP | 0 321 852 A1 | 6/1989 |
| EP | 0 380 145 | 8/1990 |
| EP | 0 416 815 A2 | 3/1991 |
| EP | 0 418 044 A2 | 3/1991 |
| EP | 0 420 436 A1 | 4/1991 |
| EP | 0 451 604 B1 | 10/1991 |
| EP | 0 501 227 A1 | 9/1992 |
| EP | 0 514 828 A1 | 11/1992 |
| EP | 0 632 065 A1 | 1/1995 |
| EP | 0 728 797 A1 | 8/1996 |
| EP | 0 754 571 B1 | 1/1997 |
| EP | 0 827 978 A1 | 3/1998 |
| EP | 0 855 413 A1 | 7/1998 |
| EP | 0 889 091 A1 | 1/1999 |
| EP | 0 893 801 A1 | 1/1999 |
| EP | 0 928 680 A1 | 7/1999 |
| EP | 0 928 702 A1 | 7/1999 |
| EP | 0 969 040 A1 | 1/2000 |
| EP | 1 029 874 A1 | 8/2000 |
| EP | 1 031 604 A2 | 8/2000 |
| EP | 1 050 547 A1 | 11/2000 |
| EP | 1 063 246 A1 | 12/2000 |
| EP | 1 077 223 A1 | 2/2001 |
| EP | 1 110 690 A2 | 6/2001 |
| GB | 1 076 873 | 7/1967 |
| GB | 1 361 241 | 7/1974 |
| GB | 1 389 342 | 4/1975 |
| GB | 1 439 247 | 6/1976 |
| GB | 2 360 288 | 9/2001 |
| JP | 62-297345 | 12/1987 |
| JP | 5-032827 | 2/1993 |
| JP | 7-265358 | 10/1995 |
| JP | 10-182894 | 7/1998 |
| JP | 10-212372 | 8/1998 |
| JP | 10-231379 | 9/1998 |
| JP | 11-60815 | 3/1999 |
| JP | 11-106573 | 4/1999 |
| JP | 2000-16009 | 1/2000 |
| JP | 2000-38477 | 2/2000 |
| JP | 2000-127711 | 5/2000 |
| JP | 2000-313205 | 11/2000 |
| JP | 2001-123026 | 5/2001 |
| JP | 2002-003659 | 1/2002 |
| JP | 2004-523642 | 8/2004 |
| WO | 92/00333 | 1/1992 |
| WO | WO 92/00333 | 1/1992 |
| WO | 93/19107 | 9/1993 |
| WO | WO 93/19107 | 9/1993 |
| WO | WO 93/25591 | 12/1993 |
| WO | 97/15583 | 5/1997 |
| WO | WO 97/15583 | 5/1997 |
| WO | WO 99/12997 | 3/1999 |
| WO | WO 00/24478 | 5/2000 |
| WO | WO 00/26268 | 5/2000 |
| WO | WO 00/62990 | 10/2000 |
| WO | WO 00/69930 | 11/2000 |
| WO | 01/12708 A1 | 2/2001 |
| WO | WO 01/12708 A1 | 2/2001 |
| WO | WO 01/49785 A1 | 7/2001 |
| WO | WO 02/083432 | 10/2002 |

OTHER PUBLICATIONS

Möhring et al.; "Homogeneous Group 4 Metallocene Ziegler-Natta Catalysts: The Influence of Cyclopentadienyl-Ring Substituents"; Journal of Organometallic Chemistry, vol. 479, pp. 1-29, (1994).

Chen et al.; ""Constrained Geometry" Dialkyl Catalysts. Efficient Syntheses, C-H Bond Activation Chemistry, Monomer-Dimer Equilibration, and α-Olefin Polymerization Catalysis"; Organometallics, vol. 16, pp. 3649-3457, (1997).

Woo et al.; "Combined Static and Dynamic Density Functional Study of the Ti(IV) Constrained Geometry Catalyst $(CpSiH_2NH)TiR^+$. 1. Resting States and Chain Propagation"; J. Am. Chem. Soc., vol. 118, pp. 13021-13030, (1996).

Chen et al.; "Organo-Lewis Acids As Cocatalysts in Cationic Metallocene Polymerization Catalysis. Unusual Characteristics of Sterically Encumbered Tris(Perfluorobiphenyl)Borane"; J. Am. Chem. Soc., vol. 118, pp. 12451-12452, (1996).

Herrmann et al.; "Synthesis and Characterization of Bridged Half-Sandwich Amides of Titanium and Zirconium"; Journal of Organometallic Chemistry, vol. 482, pp. 169-181, (1994).

Shapiro et al.; "Model Ziegler-Natta α-Olefin Polymerization Catalysts Derived From $[\{(\eta^5-C_5Me_4)SiMe_2(\eta^1-NCMe_3)\}(PMe_3)Sc(\mu_2-H)]_2$ and $[\{(\eta^5-C_5Me_4)SiMe_2(\eta^1-NCMe_3)\}Sc(\mu_2-CH_2CH_2CH_3)]_2$. Synthesis, Structures, and Kinetic and Equilibrium Investigations of the Catalytically Active Species in Solution"; J. Am., Chem. Soc. vol. 116, pp. 4623-4640, (1994).

Shapiro et al.; "[{(η5-C5Me4)Me2Si(η1-NCMe3)}(PMe3)ScH]2: A Unique Example of a Single-Component α-Olefin Polymerization Catalyst"; Organometallics, vol. 9, pp. 867-869, (1990).

Chen et al.; "Large Strain Stress Relaxation and Recovery Behavior of Amorphous Ethylene-Styrene Interpolymers"; Macromolecules, vol. 32, pp. 7587-7593, (1999).

Oliva et al.; "Copolymerization of Ethylene and Styrene to a Nearly-Alternating Crystalline Copolymer"; Macromol. Rapid Commun, vol. 17, pp. 745-748, (1996).

Jordan; "Chemistry of Cationic Dicyclopentadienyl Group 4 Metal-Alkyl Complexes" Advances in Organometallic Chemistry, vol. 32, pp. 325-387, (1991).

Kaminsky et al.; "Metallocenes for Polymer Catalysis"; Advances in Polymer Science, vol. 127, pp. 144-187, (1997).

Huang et al.; "Ziegler-Natta Catalysts for Olefin Polymerization: Mechanistic Insights From Metallocene Systems"; Prog. Polym. Sci., vol. 20, pp. 459-526, (1995).

Sinn et al.; "Ziegler-Natta Catalysis"; Advances in Organometallic Chemistry, vol. 18, pp. 99-149, (1980).

Brintzinger et al.; "Stereospecific Olefin Polymerization With Chiral Metallocene Catalysts"; Ang. Chem. Int., Ed. Engl., vol. 34, pp. 1143-1170, (1995).

Galimberti et al.; "Random Ethene/Propene Copolymerization from a Catalyst System Based on a "constrained geometry"Half-sandwich Complex", Macromol. Rapid Commun. vol. 20, No. 4, pp. 214-218, (1999).

English language Abstract of DE 196 19 509 A1.
English language Abstract of EP 0 242 840 A1.
English language Abstract of EP 0 728 797 A1.
English language ESP@CENET Abstract of JP 5-032827.
English language ESP@CENET Abstract of JP 7-265358.
English language Abstract of JP 10-182894.
English language Abstract of JP 10-212372.
English language Abstract of JP 10-231379.
English language Derwent Abstract of JP 11-60815.
Machine translation of JP 11-60815.
English language Abstract of JP 11-106573.
English translation of JP 2000-38477.
English language ESP@CENET Abstract of JP 2001-123026.

Gupta et al., "Metallocene Complexes of Group 4 Elements in the Polymerization of Monoolefins" J.M.S.—Rev. Macromol. Chem. Phys., C34(3), pp. 439-514 (1994).

Möhring, Petra C. et al., "Homogeneous Group 4 metallocene Ziegler-Natta catalysts: the influence of cyclopentadienyl-ring substituents", Journal Organometallic Chemistry, 479, pp. 1-29, (1994).

Wild, L. et al., "Determination of Branching Distributions in Polyethylene and Ethylene Copolymers", Journal of Polymer Science: Polymer Physics Edition, vol. 20, pp. 441-455, (1982).

Chen et al.; "'Constrained Geometry' Dialkyl Catalysts. Efficient Syntheses, C-H Bond Activation Chemistry, Monomer-Dimer Equilibration, and α-Olefin Polymerization Catalysis", Organometallics, vol. 16, No. 16, pp. 3649-3657, (1997).

Woo et al.; "Combined Static and Dynamic Density Functional Study of the Ti(IV) Constrained Geometry Catalyst (CpSiH2NH)TiR+. 1. Resting States and Chain Propagation", J. American Chemical Society, vol. 118, No. 51, pp. 13021-13030, (1996).

Chen et al.; "Organo-Lewis Acids As Cocatalysts in Cationic Metallocene Polymerization Catalysis. Unusual Characteristics of Sterically Encumbered Tris(perfluorobiphenyl)borane, "J. American Chemical Society, vol. 118, No. 49, pp. 12451-12452, (1996).

Herrmann et al.; "Synthesis and Characterization of Bridged Half-sandwich Amides of Titanium and Zirconium", Journal of Organometallic Chemistry, vol. 482, pp. 169-181, (1994).

Shapiro et al.; "Model Ziegler-Natta α-Olefin Polymerization Catalysts Derived form [{(η5- C5Me4)SiMe2(η1-NCMc3)}(PMe3)Sc(μ2-H)]2 and [{(η5-C5Me4)SiMe2(η1-NCMe3)} Sc(η2-CH2CH2CH3)]2. Synthesis, Structures, and Kinetic and Equilibrium Investigations of the Catalytically Active Species in Solution", J. American Chemical Society, vol. 116, No. 11, pp. 4623-4640, (1994).

Shapiro et al.; "[{(η5-C5Me4)Me2Si (η1-NCMe3)}(PMe3)ScH]2: A Unique Example of a Single-Component α-Olefin Polymerization Catalyst", Organometallics, vol. 9, No. 3, pp. 867-869, (1990).

Soga et al.; "Structures of polyethylene and Copolymers of Ethylene with 1-Octene and Oligoethylene Produced with the Cp2ZrCl2 and [(C5Me4)SiMe2N(t-Bu)]TiCl2 Catalysts", Macromol. Chem. Phys. vol. 197, pp. 4237-4251 (1996).

Chen et al.; "Large Strain Stress Relaxation and Recovery Behavior of Amorphous Ethylene-Styrene Interpolymers", Macromolecules, vol. 32, No. 22, pp. 7587-7592, (1999).

Oliva et al.; "Zirconocene-Based Catalysts for the Ethylene-Styrene Copolymerization: Reactivity Ratios and Reaction Mechanism", Macromolecules, vol. 30, No. 19, pp. 5616-5619, (1997).

Oliva et al.; "Copolymerization of Ethylene and Styrene to a Nearly-Alternating Crystalline Copolymer", Macromol. Rapid Commun. vol. 17, pp. 745-748 (1996).

Brintzinger et al.; "Stereospecific Olefin Polymerization with Chiral Metallocene Catalysts", Angew. Chem. Int. Ed. Engl., vol. 34, pp. 1143-1170, (1995).

J. Huang et al.; "Ziegler-Natta Catalysts for Olefin Polymerization: Mechanistic Insights From Metallocene Systems", Prog. Polym. Sci., vol. 20, pp. 459-526, (1995).

Kaminsky et al.; "Metallocenes for Polymer Catalysis", Advances in Polymer Science, vol. 127, pp. 143-187, (1997).

Jordan; "Chemistry of Cationic Dicyclopentadienyl Group 4 Metal-Alkyl Complexes", Advances in Organometallic Chemistry, vol. 32, pp. 325-387, (1991).

Sinn et al.; "Ziegler-Natta Catalysis", Advances in Organometallic Chemistry, vol. 18, pp. 99-149, (1980).

Ellwood; "A Tale of Continuous Development"; Mixing Developments, European Rubber Journal, pp. 26-28, (1987).

Galimberti et al.; "Random Ethene/Propene Copolymerization from a Catalyst System Based on a "constrained geometry" Half-sandwich Complex", Macromol. Rapid Commun. vol. 20, No. 4, pp. 214-218, (1999).

Xu et al.; "Ethylene Copolymerization with 1-Octene Using a 2-Methylbenz[e]indenyl-Based ansa-Monocyclopentadienylamido Complex and Methylaluminoxanes Catalyst", Macromolecules, vol. 31, No. 15, pp. 4724-4729, (1998).

Honda et al., "Olefin—aromatic viinyl compound copolymer—containing rubber compositions and their tough moldings," Chemical Abstracts, 132: 294994h of JP 2000 119,457, (1998).

Longo et al.; "Copolymerization of Styrene and Ethylene in the Presence of Different Syndiospecific Catalysts", Makromol. Chem. vol. 191, pp. 2387-2396, (1990).

Galimberti et al.; "Metallocenes as Catalysts for the Copolymerization of Ethene with Propene and Dienes", Methallocene-based Polyolefins, John Wiley & Sons, Ltd, vol. 1, Chapter 14, pp. 309-343, (1999).

Copending U.S. Appl. No. 10/474,430, Title: Tyre Comprising an Ethylene Copolymer, Tread Band and Elastomeric Composition Used Therein, filed Oct. 9, 2003.

Office Action in copending U.S. Appl. No. 10/474,430 dated Feb. 11, 2008.
Office Action in copending U.S. Appl. No. 10/474,430 dated Oct. 17, 2007.
Office Action in copending U.S. Appl. No. 10/474,430 dated Jun. 8, 2007.
Office Action in copending U.S. Appl. No. 10/474,430 dated Aug. 22, 2006.
Office Action in copending U.S. Appl. No. 10/474,430 dated Mar. 6, 2006.

Declaration under 37 CFR 1.132 submitted in co-pending U.S. Appl. No. 10/474,430 dated Apr. 27, 2007.

International Search Report for PCT/EP02/03942 dated Aug. 13, 2002, related to U.S. Appl. No. 10/474,430.

International Preliminary Examination Report for PCT/EP02/03942 dated Jan. 22, 2003, related to U.S. Appl. No. 10/474,430.

Copending U.S. Appl. No. 10/474,639, Title: Product in Subdivided Form for Preparing Crosslinkable Elastomeric Compositions, filed May 10, 2004.

Office Action in copending U.S. Appl. No. 10/474,639 dated Dec. 12, 2007.

Advisory Action in copending U.S. Appl. No. 10/474,639 dated Aug. 29, 2007.

Office Action in copending U.S. Appl. No. 10/474,639 dated May 2, 2007.
Office Action in copending U.S. Appl. No. 10/474,639 dated Oct. 13, 2006.
Office Action in copending U.S. Appl. No. 10/474,639 dated Apr. 26, 2006.
International Search Report for PCT/EP02/03943 dated Aug. 30, 2002, related to U.S. Appl. No. 10/474,639.
International Preliminary Examination Report for PCT/EP02/03943 dated Aug. 22, 2003, related to U.S. Appl. No. 10/474,639.
Copending U.S. Appl. No. 10/497,999, Title: Process and Apparatus for Continuously Producing an Elastomeric Composition, filed Oct. 26, 2004.
Office Action in copending U.S. Appl. No. 10/497,999 dated Jun. 27, 2008.
International Search Report for PCT/EP02/13710 dated Dec. 2, 2003, related to U.S. Appl. No. 10/497,999.
Office Action in copending U.S. Appl. No. 10/497,999 dated Mar. 4, 2009.

* cited by examiner

Figure 1a

PROCESS FOR CONTINUOUSLY PRODUCING AN ELASTOMERIC COMPOSITION

CROSS REFERENCE TO RELATED APPLICATIONS

This application is an national phase application based on PCT/EP02/08145, filed Jul. 22, 2002, the content of which is incorporated herein by reference, and claims the benefit of U.S. Provisional Application No. 60/309,166, filed Aug. 2, 2001, and claims the right to priority based on European Application No. 01117993.4, filed Jul. 25, 2001.

BACKGROUND OF THE INVENTION

1. Field of the Invention

The present invention relates to a process and apparatus for continuously producing an elastomeric composition. More particularly, the present invention relates to a process and apparatus for continuously producing an elastomeric composition by means of at least one extruder, the resulting elastomeric composition being primarily, but not exclusively, intended for use in the production of tyres.

2. Description of the Related Art

Conventionally, the production of elastomeric compositions (in the following also indicated as "rubber mixtures") is performed batchwise by means of internal mixers, usually Banbury mixers having two counter-rotating rotors which exert an intensive mixing action to masticate the rubber ingredients and to incorporate and thoroughly disperse therein the other ingredients, including fillers, lubricating aids, curatives and auxiliary substances.

The compounding process using internal mixers shows many drawbacks, particularly a poor heat dissipation and thus a scarce temperature control, mainly due to an unfavourable ratio between material volume and mixer surface area. To improve dispersion in the rubber base, the various ingredients, and particularly the fillers, are incorporated into the rubber base in batches distributed in a plurality of mixing operations separated by cooling and stocking steps. Temperature sensitive ingredients, such as cross-linking agents and accelerators, are added only during the final mixing step after cooling the rubber mixture below a predetermined temperature (usually below 110° C.) to avoid scorching.

Therefore, the compounding process in internal mixers, although still remaining the most widely used mixing process in the rubber industry, is time and energy consuming and does not guarantee an effective control on the characteristics of the resulting elastomeric compositions, particularly as regards dispersion homogeneity of fillers into the rubber base. Variation in the added amounts of individual ingredients, timing of addition and discharge from the mixers, initial temperature of the raw materials, and fluctuations of shear forces inside the material during mixing, all contribute to batch-to-batch variation.

To overcome the limitations of the discontinuous processes, many attempts have been performed by the rubber industry to set up continuous compounding processes, based on extrusion techniques analogous to those commonly employed in the processing of thermoplastic polymer materials. Continuous mixing processes carried out by means of an extruder should improve uniformity in the rubber mixture characteristics, better thermal management resulting from improved surface-to-mass ratios, and possible development of highly automated operations. For an overview on this subject see the article "A tale of continuous development" by H. Ellwood, published in European Rubber Journal, March 1987, pages 26-28.

U.S. Pat. No. 4,897,236 discloses a process and an apparatus for continuously producing a rubber mixture, wherein the ingredients of the mixture are fed, masticated and homogenized in a twin-screw extruder. The resulting mixture is divided into a first and a second portion. The first portion is discharged, while the second portion is recycled for further homogenization and for mixing with fresh batches of the ingredients being fed into the extruder. The recycled portion is circulated to and returned from a cooled, annular chamber exterior to the extruder chamber, said annular chamber having outflow and inflow passages communicating with the interior of the extruder. That partial recycling of the rubber mixture should compensate for fluctuations in the metering of the ingredients and for local inhomogeneities which may occur. Moreover, the intensive cooling of the recycled portion in the annular chamber should correct a rising processing temperature, and should improve the dispersing action because of increased shearing stresses consequent to the temperature decrease.

U.S. Pat. No. 5,302,635 discloses a method and apparatus for continuously producing a rubber composition. In a first step, crude rubber is continuously fed into a twin-screw extruder, added with non-reactive additives (oils and fillers) and the resulting mixture is plasticated and homogenized by the extruder screws. During that first step, the mixture is kept at a temperature of from 100 C. to 160° C. Then, in a second step, the resulting mixture is cooled to a temperature of from 100° C. to 120° C. and reactive additives (particularly sulfur and vulcanization accelerators) are fed and incorporated into the rubber mixture. The homogenized end rubber composition then leaves the extruder via the extruder outlet opening.

The process can be carried out according to different extruder configurations. For instance, the two mixing steps can be performed in a single twin-screw extruder having two distinct mixing zones operating at two different temperatures. Alternatively, the first step may be carried out in a first twin-screw extruder operating at 100° C.-160° C.; the resulting base composition is then fed directly to a second twin-screw extruder operating at 100° C.-120° C. According to another embodiment, the process may be performed in a single extruder having two screw pairs driven at mutually opposite ends of the extruder housing, the two screw pairs operating at different temperatures.

U.S. Pat. No. 5,158,725 discloses a method for continuously producing elastomer compositions which comprises: feeding an elastomer into a twin-screw extruder; feeding at least one filler, oil and/or other elastomers into the extruder; mixing the ingredients to provide a homogeneous mixture which is maintained at a Mooney viscosity ML(1+4) at 100° C. between 20 and 250 during mixing; discharging the resulting mixture from the extruder. Precise volumetric or loss-in-weight feeders are used to meter the elastomer and other ingredients into the extruder. After leaving the extruder, the compounded rubber may be extruded through a die, calendered into sheets, strips or strands, or may be pelletized. The continuous method is less expensive than the multi-step batchwise processes currently used in the art and requires less manpower and less material handling. Moreover, improved dispersion and homogeneity of the resulting elastomeric compositions would result.

U.S. Pat. No. 5,262,111 discloses a process for the continuous production of a rubber composition in a twin-screw extruder. Rubber is fed into the extruder together with a processing aid and masticated up to a temperature of 120° C.

to 180° C. Subsequently, a first part of carbon black, representing preferably 40-80% of the whole quantity of carbon black, is fed into the heated extrudate. Afterwards, plasticizing oil is added to the extrudate before the second remaining carbon black part is fed and incorporated into the extrudate at a temperature of from 120° C. to 180° C. The whole composition is then cooled to a temperature of from 100° C. to 120° C., a crosslinking agent is added, and the composition is homogenized and extruded. The process would improve the dispersion of carbon black in the extrudate while reducing the specific energy requirement.

U.S. Pat. No. 5,626,420 discloses a continuous mixing process and apparatus, wherein base elastomer(s) and other components are continuously dosed and introduced into a mixing chamber formed of a stator and a rotor rotating therein, preferably a single screw extruder. The introduced components advance within the mixing chamber along zones of propulsion and mixing. To improve dispersion and homogenizing of the rubber components, the filling rate of the mixing chamber in at least certain mixing zones is lower than 1. To properly introduce the components, and particularly the rubber base, into the mixing chamber, force feeding means are used, such as volumetric pumps (e.g. gear pumps). To obtain precise dosage of the different components, it may be desirable to add the components in a mixing zone where the filling rate is equal to 1, located between two mixing zones having a filling rate lower than 1.

U.S. Pat. No. 5,374,387 describes a process for continuously producing elastomeric compositions using a twin-screw extruder, which comprises the following sequential steps. In a first mixing zone of the extruder an elastomeric material is added, sheared and heated to a first operating temperature (typically from 130° C. to 220° C.) while reducing viscosity. Then the elastomeric material is passed in a second mixing zone where it is added with at least a first portion of a reinforcing filler and processing aid, while simultaneously cooling the rubber mixture to a second operating temperature (typically from 110° C. to 160° C.). The resulting mixture is then passed to an optional third mixing zone, where small constituent chemicals, such as adhesion promoters, anti-ozonants, color additives, fire retardants and the like, are introduced into the rubber mixture. Preferably, in said third mixing zone a second portion of the reinforcing filler and processing aid is added so as to reach a third operating temperature (typically from 85° C. to 130° C.). Then, in a fourth mixing zone the rubber mixture is supplemented with the vulcanization agent at a fourth operating temperature (typically from 115° C. to 150° C.). The mixture flow is then directed through a delivery zone (fifth zone) wherein the mixture flow is extruded into the desired form through some sort of die slot or the like. The various components of the rubber composition are continuously and individually metered to the extruder, preferably in the form of particulated materials and/or liquids by means of weight loss feeders.

U.S. Pat. No. 5,711,904 discloses a method for continuous mixing of elastomeric compositions reinforced with silica. A twin-screw extruder is fed with the elastomeric material, then with silica and other compounding ingredients, including a silica coupler. Temperature and pressure along the extruder are controlled to enable the silica coupler to react with the silica and the elastomeric material. Then curatives and accelerators are added, while maintaining the mixture at a Mooney viscosity ML(1+4) at 100° C. between 20 and 250. The mixing is continued for a time sufficient to thoroughly mix the curatives and accelerators. The resulting elastomeric composition is then forced through a suitable die mounted at the extruder exit. The overall process may be performed using a single extruder or a sequence of extruders. Preferably, residence time is increased in a first twin-screw extruder and then the composition is cooled, ground and dumped into a second twin-screw extruder where the rubber mix is completed with curatives and other ingredients. The different extruders may be separate independent entitites or may be coupled to each other to form one continuous process. The extruders may be closely coupled in a cross-head extruder mounting, or may be more loosely connected, for instance via festoons or belts that convey the material from one unit to the other.

In the Applicant's view, one of the most critical aspects in the production of an elastomeric composition by a continuous process is the addition to the rubber base of the so called "minor ingredients", which are those components different from rubbers, reinforcing fillers and plasticizing agents (e.g. vulcanizing agents, vulcanization accelerators and retardants, protective agents, hardening resins, etc.), which are added to modify and/or to improve the characteristics of the elastomeric compositions. The minor ingredients are very numerous (usually at least 5-15 in a single rubber mixture) and used in little amounts (generally not greater than 5% by weight with respect to the total weight of the rubber mixture). Types and amounts of the minor ingredients to be added vary according to the elastomeric composition to be produced.

Usually, in the discontinuous compounding processes the minor ingredients are managed off-line. They are weighed as raw materials, charged into bags of a low melting material, sealed and automatically labelled with barcodes and alphanumeric data. Then, the labelled bags are manually introduced in the mixer hopper according to predetermined procedures which depend on the recipe of the rubber mixture to be produced. A tyre manufacturer typically has to manage about 30-40 different minor ingredients.

The above off-line managing of the minor ingredients is totally unfeasible in a continuous compounding process, where all the ingredients must be continuously and automatically dosed and fed into the extruder. The dosage shall be very accurate and the feeding shall proceed smoothly, since dramatic variations in the properties of the final rubber mixture may occur because of even little fluctuations in the added amounts of the minor ingredients.

Furthermore, addition of the minor ingredients as raw, substantially pure products shows many shortcomings. Firstly, the raw products are usually in the form of powders or of liquids, which are hardly dispersible in the rubber base and therefore require long mixing times. Additionally, an accurate continuous metering of little amounts of a concentrated product is difficult on an industrial scale, particularly when the product is poorly flowable, for instance in the case of low melting compounds or materials which show electrostatic charge accumulation. Finally, the raw products may give off vapours and/or powders which can cause unpleasant odours and safety problems, particularly in the case of noxious or toxic substances.

SUMMARY OF THE INVENTION

The Applicant has now found that a process for the continuous production of elastomeric compositions may be carried out in at least one extruder by using the minor ingredients in the form of subdivided products, said products including at least one of the minor ingredients dispersed in a thermoplastic binding agent. Such products are conveyed to a dosing device by means of a pneumatic conveying line, and thus can be accurately metered and continuously fed into the extruder. The thermoplastic binding agent guarantees to the subdivided product free-flowing properties and high dimensional regularity and stability, even upon intense compression and/or friction stresses, such as those occurring in a pneumatic conveying line. Therefore, the subdivided product is suitable for a pneumatic transportation and for an accurate dosage, substantially without formation of fine powders and undesired changes in shape and/or dimensions of the granules. Moreover, the thermoplastic binding agent readily melts when introduced into the extruder, thus acting as a processing aid, and remarkably improves dispersion of the minor ingredient into the rubber base, without causing any significant changes in the properties of the final elastomeric composition.

Therefore, in a first aspect the present invention relates to a process for continuously producing an elastomeric composition, comprising the steps of:

providing at least one extruder comprising a housing, at least one screw rotatably mounted in said housing, said housing including at least one feed opening and a discharge opening;

metering and feeding into said at least one extruder at least one elastomer and at least one filler;

metering and feeding into said at least one extruder minor ingredients different from elastomers and fillers;

mixing and dispersing said at least one filler and minor ingredients into said at least one elastomer by means of said at least one extruder;

extruding the resulting elastomeric composition through said discharge opening;

wherein at least one of said minor ingredients is conveyed, before metering and feeding into the extruder, by means of a pneumatic conveying line in the form of a subdivided product, said product including said at least one minor ingredient dispersed in at least one thermoplastic binding agent.

According to a preferred aspect, at least one plasticizing agent is further metered and fed into the extruder.

According to a preferred aspect, the subdivided product is metered and fed by means of a gravimetric feeder.

According to another preferred aspect, the subdivided product contains from 40% to 98% by weight, more preferably from 50% to 95% by weight, even more preferably from 70% to 85% by weight, of said at least one minor ingredient, with respect to the total weight of said product.

According to another preferred aspect, the subdivided product has a Shore A hardness not lower than 45 and a Shore D hardness not greater than 65. More preferably, the subdivided product has a Shore D hardness of from 20 to 60. Shore A and Shore D hardnesses are measured according to ASTM Standard D2240-00.

According to the present invention, the subdivided product may be in any subdivided free-flowing form suitable for a pneumatic conveying, e.g. in the form of granules, pellets, beads, pearls and the like, having average dimensions generally of from 0.5 mm to 5 mm, preferably from 1 mm to 3 mm.

According to a further aspect, the present invention relates to an apparatus for continuously producing an elastomeric composition, comprising:

at least one extruder comprising a housing, at least one screw rotatably mounted in said housing, said housing including at least one feed opening and a discharge opening;

at least one first metering device to meter and feed into said at least one extruder at least one elastomer and at least one filler through said at least one feed opening;

at least one second metering device to meter and feed into said at least one extruder minor ingredients different from elastomers and fillers, at least one of said minor ingredients being in the form of a subdivided product including said at least one minor ingredient dispersed in at least one thermoplastic binding agent;

at least one pneumatic conveying line to convey said at least one minor ingredient in the form of a subdivided product from a storage bin to said at least one second metering device.

Minor ingredients that can be metered and fed in the form of a subdivided product according to the present invention may be selected, for instance, from:

(a1) crosslinking agents, such as: sulfur (usually in a soluble crystalline form or in a insoluble polymeric form, optionally dispersed in an oily phase); sulfur donors (e.g. alkylthiuram disulfides); organic peroxides;

(a2) crosslinking accelerators, such as: thiazoles, sulfenamides, guanidines, thiurams, dithiocarbamates, amines, xanthogenates;

(a3) synthetic resins, such as alpha-methylstyrene resins, cumarone resins;

(a4) crosslinking activators, such as zinc compounds (e.g. ZnO, $ZnCO_3$, fatty acid zinc salts);

(a5) crosslinking retardants, such as carboxylic acids, phthalimide derivatives, diphenylamine derivatives;

(a6) adhesion promoters, such as hexamethylentetramine (HMT), resocinol;

(a7) protective agents, such as aromatic diamines (e.g. N-(1,3-dimethylbutyl)-N'-p-phenylendiamine (6PPD)), dihydrochinoline derivatives, imidazole derivatives;

(a8) coupling agents, such as coupling agents for silica, particularly sulfur-containing hydrolyzable silanes (e.g. 3,3'-bis(triethoxy-silylpropyl)tetrasulfide (TESPT));

(a9) condensation catalysts, such as metal carboxylates (e.g. dibutyltindilaurate (DBTL)).

The above list is given only to illustrate some examples of the most common minor ingredients used in rubber mixtures, particularly in rubber mixtures for tyres, and shall not be intended as limitative of the scope of the present invention.

According to a preferred aspect, in the process of the present invention a first extruder and a second extruder are provided, wherein by means of said first extruder an intermediate rubber mixture devoid of temperature sensitive minor ingredients is produced, and by means of said second extruder a complete rubber mixture including said temperature sensitive minor ingredients is produced.

According to a preferred aspect, the thermoplastic binding agent has a melting temperature (Tm) not lower than 40° C., preferably from 50° C. to 120° C. The melting temperature may be determined according to known techniques, e.g. by Differential Scanning Calorimetry (DSC).

More preferably, the thermoplastic binding agent comprises a polymer selected from:

(i) ethylene homopolymers or copolymers of ethylene with at least one aliphatic or aromatic alpha-olefin, and optionally with at least one polyene;

(ii) copolymers of ethylene with at least one ethylenically unsaturated ester;

(iii) polymers obtained by methatesis reaction of at least one cycloalkene;

or mixtures thereof.

With reference to the polymer (i), with alpha-olefin is generally meant an olefin of formula $CH_2$=CH—R, where R is:

an alkyl group, linear or branched, having from 1 to 12 carbon atoms; or an aryl group having from 6 to 14 carbon atoms.

Preferably, the aliphatic alpha-olefin is selected from: propylene, 1-butene, isobutene, 1-pentene, 4-methyl-1-pentene, 1-hexene, 1-octene, 1-dodecene, or mixtures thereof. Preferably, the aromatic alpha-olefin is selected from styrene, alpha-methyl-styrene, or mixtures thereof.

Preferably, the polyene optionally present as comonomer of the polymer (i) is a conjugated or non-conjugated diene, triene or tetraene, having generally from 4 to 20 carbon atoms. The polyene is preferably selected from: 1,3-butadiene, 1,4-hexadiene, 1,6-octadiene, 1,4-cyclohexadiene, 5-ethylidene-2-norbornene, 5-methylene-2-norbornene, vinylnorbornene, or mixtures thereof.

The polymer (i) generally has the following monomer composition: 50%-100% by mole, preferably 60%-97% by mole, of ethylene; 0%-50% by mole, preferably 3%-40% by mole, of an aliphatic or aromatic alpha-olefin; 0%-5% by mole, preferably 0%-2% by mole, of a polyene.

According to a preferred embodiment, the polymer (i) is a copolymer of ethylene with at least one aliphatic or aromatic alpha-olefin, and optionally with at least one polyene, having a molecular weight distribution index (MWD) lower than 5, preferably from 1.5 to 3.5. It may be obtained by copolymerization of ethylene with an aliphatic or aromatic alpha-olefin, and optionally a polyene, in the presence of a single-site catalyst, for instance a metallocene catalyst or a Constrained Geometry-Catalyst.

Suitable metallocene catalysts are, for instance, coordination complexes of a transition metal, usually of Group IV, particularly titanium, zirconium or hafnium, with two cyclopentadienyl ligands, optionally substituted, used in combination with a co-catalyst, for instance an alumoxane, preferably a methylalumoxane, or a boron compound. See, e.g., Adv. Organomet. Chem, Vol. 18, pag. 99, (1980); Adv. Organomet. Chem, Vol. 32, pag. 325, (1991); J. M. S.—Rev. Macromol. Chem. Phys., Vol. C34(3), pag. 439, (1994); J. Organometallic Chemistry, Vol. 479, pagg. 1-29, (1994); Angew. Chem. Int., Ed. Engl., Vol. 34, pag. 1143, (1995); Prog. Polym. Sci., Vol. 20, pag. 459 (1995); Adv. Polym. Sci., Vol. 127, pag. 144, (1997); U.S. Pat. No. 5,229,478, or patent applications WO 93/19107, EP-35,342, EP-129,368, EP-277,003, EP-277,004, EP-632,065; Macromol. Rapid. Commun., Vol. 17, pagg. 745-748, (1996); Makromol. Chem., Vol. 191, pag. 2378-2396 (1990).

Suitable Constrained Geometry Catalysts are, for instance, coordination complexes of a metal, usually of Groups 3-10 or of Lanthanide series, with only one cyclopentadienyl ligand, optionally substituted, used in combination with a co-catalyst, for instance an alumoxane, preferably a methylalumoxane, or a boron compound (see, e.g., Organometallics, Vol. 16, pag. 3649, (1997); J. Am. Chem. Soc., Vol. 118, pag. 13021, (1996); J. Am. Chem. Soc., Vol. 118, pag. 12451, (1996); J. Organometallic Chemistry, Vol. 482, pag. 169, (1994); J. Am. Chem. Soc., Vol. 116, pag. 4623, (1994); Organometallics, Vol. 9, pag. 867, (1990); U.S. Pat. Nos. 5,096,867 and No. 5,414,040, or patent applications WO 92/00333, WO 97/15583, WO 01/12708, EP-416,815, EP-418,044, EP-420,436, EP-514,828; Macromol. Chem. Phys., Vol. 197, pag. 1071-1083, (1996); Macromolecules, Vol. 32, pag. 7587-7593; patent applications WO 01/12708, EP-514,828, EP-416,815.

The above ethylene copolymers have preferably the following properties:
density of from 0.86 g/cm$^3$ to 0.93 g/cm$^3$;
Mooney viscosity ML (1+4) at 125° C., measured according to ASTM Standard D1646-00, generally not lower than 5, preferably from 8 to 40;
Melt Flow Index (MFI), measured according to ASTM Standard D1238-00, of from 0.1 g/10' to 35 g/10', preferably from 1 g/10' to 20 g/10';
melting temperature (Tm) of from 50° C. to 120° C., preferably from 55° C. to 110° C.;
melting enthalpy (ΔHm) of from 30 J/g to 150 J/g, preferably from 34 J/g to 130 J/g.

Examples of preferred ethylene copolymers as defined above are commercial products Engage® by DuPont-Dow Elastomers and Exact® by Exxon Chemical.

With reference to the polymer (ii), it is preferably a copolymer of ethylene with at least one ethylenically unsaturated ester selected from: alkyl acrylates, alkyl methacrylates and vinyl carboxylates, wherein the alkyl group, linear or branched, may have from 1 to 8, preferably from 1 to 4, carbon atoms, while the carboxylate group, linear or branched, may have from 2 to 8, preferably, from 2 to 5, carbon atoms. The ethylenically unsaturated ester is present in the polymer (ii) generally in an amount of from 5% to 50% by weight, preferably from 15% to 40% by weight. Examples of acrylates or methacrylates are: ethyl acrylate, methyl acrylate, methyl methacrylate, t-butyl acrylate, n-butyl acrylate, n-butyl methacrylate, 2-ethylhexyl acrylate. Examples of vinyl carboxylates are: vinyl acetate, vinyl propionate, vinyl butanoate. Preferably, the polymer (ii) is selected from: ethylene/vinylacetate copolymer (EVA), ethylene/ethylacrylate copolymer (EEA) ethylene/butylacrylate copolymer (EBA).

With reference to the polymer (iii), it may be obtained according to known techniques, by methatetis reaction, in solution, of a cycloalkene such as, for instance, cyclopentene, cyclooctene, cyclododecene. Further details on the preparation of such polymers are described, e.g., by Scott, Calderon, Ofstead, Judy and Ward in *Rubber Chem. and Tech.*, 44 (1971), and in U.S. Pat. No. 3,816,358 and U.S. Pat. No. 4,153,772.

Preferably, the polymer (iii) has the following properties:
percentage of double bonds in trans configuration, determined by infrared (IR) spectroscopy, of at least 60% by mole, preferably from 75% to 95% by mole;
Mooney viscosity ML (1+4) at 125° C., measured according to ASTM Standard D1646-00, of from 2 to 20, preferably from 5 to 15;
melting temperature (Tm), measured by DSC, of from 25° C. to 80° C., preferably from 40° C. to 60° C.;
glass transition temperature (Tg), measured according to DIN Standard 53445, of from −90° C. to −50° C., preferably from −80° C. to −60° C.

As polymer (iii) polyoctenamer is particularly preferred, e.g. one of those commercially available under the trademark Vestenamer® by Degussa-Hüls.

The thermoplastic binding agent according to the present invention may be used in admixture with at least one elastomeric polymer, having a glass transition temperature (Tg) lower than 20° C., preferably from 0° C. to −90° C. The addition of at least one elastomeric polymer may improve resistance of the subdivided product to mechanical stresses; particularly to impacts. The amount of the elastomeric polymer may be generally of from 0 to 40% by weight, preferably from 10% to 20% by weight, with respect to the weight of the minor ingredient present in the subdivided product.

The elastomeric polymer may be generally selected from: diene elastomeric polymers and mono-olefin elastomeric polymers.

Diene elastomeric polymers are generally of natural origin, or may be obtained by polymerization, in solution or in emulsion, of at least one conjugated diolefin, optionally with at least one monovinylarene in an amount not exceeding 50% by weight. Examples of diene elastomeric polymers are: cis-1,4-polyisoprene (either natural or synthetic, preferably natural rubber), 3,4-polyisoprene, polychloroprene, isoprene/ isobutene copolymers, 1,3-butadiene/acrylonitrile copolymers, 1,3-butadiene/styrene copolymers, isoprene/styrene copolymers, isoprene/1,3-butadiene/styrene terpolymers; or mixtures thereof.

As to mono-olefin elastomeric polymers, they may be selected from: copolymers of ethylene with at least one alpha-olefin having from 3 to 12 carbon atoms, and optionally with a diene having from 4 to 12 carbon atoms; polyisobutene; copolymers of isobutene with at least one diene. Particularly preferred are: ethylene/propylene copolymers (EPR); ethylene/propylene/diene terpolymers (EPDM); polyisobutene; butyl rubbers; halobutyl rubbers; or mixtures thereof.

To improve mechanical resistance of the subdivided product, at least one reinforcing filler may also be added to the thermoplastic binding agent, such as: carbon black, silica, alumina, aluminosilicates, calcium carbonate, kaolin, titanium bioxide, or mixtures thereof. The amount of the reinforcing filler may be generally of from 0 to 60% by weight, preferably from 5% to 40% by weight, with respect to the weight of the minor ingredient present in the subdivided product.

To improve dispersion of the minor ingredient into the thermoplastic binding agent, at least one plasticizing agent may be further added to the subdivided product. The plasticizing agent may be selected for instance from: mineral oils, such as paraffinic oils, naphtenic oils, aromatic oils; vegetable oils; or mixtures thereof. The amount of the plasticizing agent may be generally of from 0 to 40% by weight, preferably from 5% to 10% by weight, with respect to the weight of the minor ingredient present in the subdivided product.

BRIEF DESCRIPTION OF THE DRAWINGS

The present invention is now further illustrated with reference to the attached figures wherein.

DETAILED DESCRIPTION OF THE EXEMPLARY EMBODIMENTS

Figure 1A:
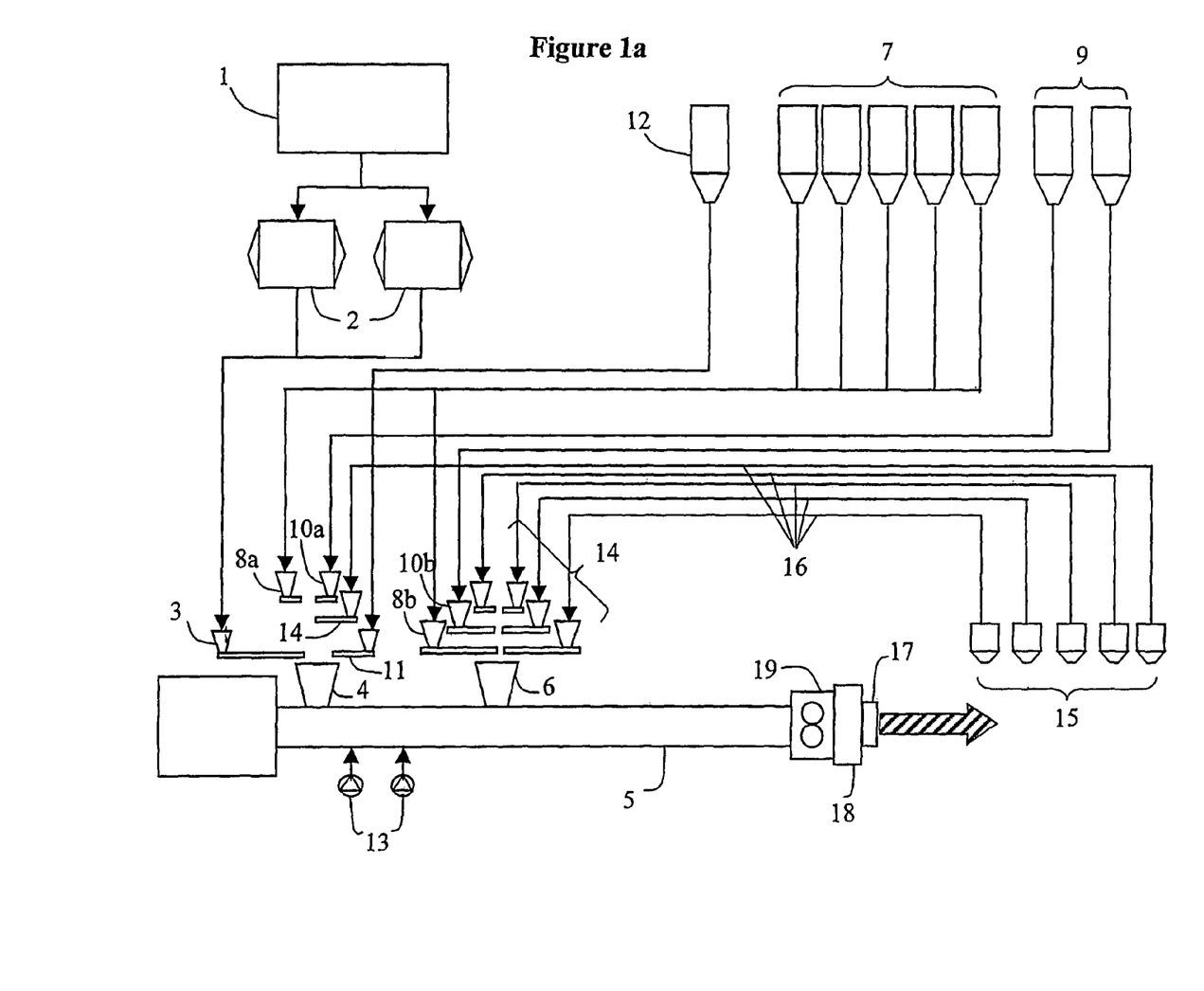
FIG. 1a is a schematic diagram of the first part of a continuous production plant of rubber mixtures according to the present invention, wherein the intermediate rubber mixture is produced.

With reference to FIG. 1a, the first part of the production plant, where the intermediate rubber mixture is produced, includes a rubber grinder (1) where the rubber base materials, which are usually provided by manufacturers in bales, are comminuted in irregular particles (crumbs) of small size (about 3-50 mm as average dimensions), e.g. by means of blades. The rubber crumbs are then supplemented with an antisticking agent (e.g. chalk, silica, or other powders) and then introduced into rubber storage drums (2), where the rubber particles are continuously or stepwise slowly rotated to prevent re-agglomeration. To obtain a continuous feeding of the rubber crumbs to the plant, usually at least two drums are used, which are alternately filled and discharged. The rubber crumbs are then conveyed e.g. by means of a conveyor belt, to a loss-in-weight gravimetric feeder (3), for metering the rubber materials and feed them to the main feed hopper (4) of the first extruder (5).

Using the same hopper (4) and/or through an additional feed hopper (6), reinforcing fillers are introduced into the first extruder (5). The use of an additional feed hopper (6) (as represented in FIG. 1a) allows to add the total amount of reinforcing fillers in portions at different points of the extruder (5), so as to improve dispersion of the fillers in the rubber base. In the embodiment represented in FIG. 1a, different types of carbon black may be conveyed from storage bins (7) to corresponding gravimetric feeders (8a, 8b), while different types of silica may be conveyed from other storage bins (9) to corresponding gravimetric feeders (10a, 10b). The extruder (5) may be also provided with an additional gravimetric feeder (11) to feed, from a corresponding storage bin (12), those rubbers which are available in the form of powder. Gravimetrically controlled feeding pumps (13) are also provided to introduce into the extruder (5) plasticizing oils and possibly other liquid ingredients, such as silica coupling agents (e.g. silanes) and adhesion promoters (e.g. cobalt salts).

At least one of the feed hoppers (4, 6) of the extruder (5) is provided with gravimetric feeders (14) to meter and feed subdivided products (e.g. granules) containing the minor ingredients, according to the present invention. The granules are conveyed to the gravimetric feeders (14) from storage bins (15) by means of pneumatic conveying lines (16).

According to a preferred embodiment, each type of granular product containing a specific minor ingredient (or a predetermined mixture of different minor ingredients) is individually conveyed, metered and fed by means of a dedicated pneumatic conveying line (16) and a dedicated gravimetric feeder (14). In that way, irregular feeding and inaccurate metering deriving from different densities of the granules are prevented, since granules of the same density are fed to the extruder (5). Alternatively, to reduce metering errors due to a scarce filling of the gravimetric feeders (14), different granular products may be metered and fed by means of the same gravimetric feeder (14).

The minor ingredients to be fed to the first extruder (5) are generally those ingredients which are not temperature sensitive, and therefore cannot degrade and/or cause scorching. Moreover, it is to be avoided to feed to the first extruder (5) those minor ingredients which can interfere with reactions which may occur during the first mixing stage. For instance, in the case of silica filled rubber mixtures, zinc derivatives (e.g. ZnO) and amine compounds are added only during the second mixing step, since they can interfere with the silanization reaction between the coupling agent and silica. Generally, in the first extruder (5) all the minor ingredients are fed except: crosslinking agents, crosslinking accelerators, crosslinking retardants, and crosslinking activators.

The intermediate rubber mixture is discharged from the first extruder (5) through a die (17). Preferably, before leaving the first extruder, the intermediate rubber mixture is filtered to eliminate possible aggregates, metal particles or other impurities. To that purpose, a filtering body (18) (e.g. a screen filter) is placed before the die (17). To impart to the extruded material a pressure sufficient to pass the filtering body (18), a gear pump (19) is preferably placed upstream of the filtering body (18).

Figure 1B:
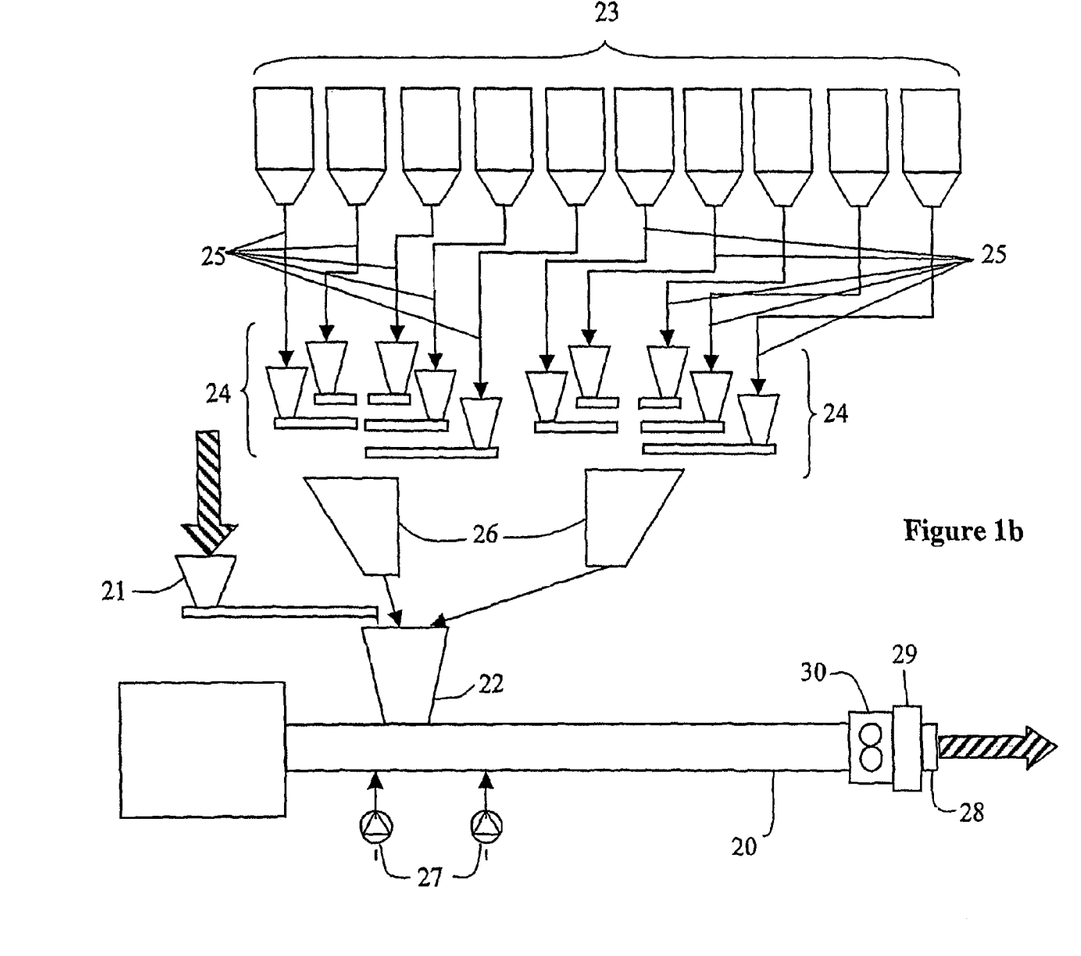
FIG. 1b is a schematic diagram of the second part of a continuous production plant of rubber mixtures according to the present invention, wherein the final curable rubber mixture is produced starting from the intermediate rubber mixture.

Referring now to FIG. 1b, the intermediate rubber mixture discharged from the first extruder (5) is then conveyed to the second extruder (20), where the rubber mixture is completed with the temperature sensitive ingredients. The passage of the rubber mixture from the first to the second extruder may be performed according to any known method, and should be used to cool down the intermediate mixture to avoid rubber scorching during the second mixing step. For instance, the passage from the first to the second extruder may be obtained by a "loose" connection, for instance by festoons of the intermediate rubber mixture extruded in the form of a continuous strip or sheet. Preferably, the intermediate rubber mixture is granulated, e.g. by passing it through a perforated die plate equipped with blades (not represented in the figures).

The intermediate rubber mixture is conveyed, e.g. by means of a conveyor belt, to a loss-in-weight gravimetric feeder (21) for metering and feeding to the second extruder (20) through a feed hopper (22). Through the same feed hopper (21) (or preferably through an additional feed hopper—not represented in FIG. 1b), the minor ingredients necessary to complete the rubber mixture are fed to the extruder (20). According to the present invention, said minor ingredients are used in the form of subdivided products (e.g. granules). The granules are conveyed from storage bins (23) to gravimetric feeders (24) by means of pneumatic conveying lines (25). Analogously to the first phase of the production process, preferably each type of granular product containing a specific minor ingredient (or a predetermined mixture of different minor ingredients) is individually conveyed, metered and fed by means of a dedicated pneumatic conveying line (25) and a dedicated gravimetric feeder (24). Alternatively, different granular products may be metered and fed by means of the same gravimetric feeder (24). As represented in FIG. 1b, after metering, different granular products may be fed to additional hoppers (26) which convey the granular products to the extruder hopper (22).

The minor ingredients to be fed to the second extruder (20) in the form of subdivided products are generally those ingredients, necessary to complete the rubber mixture, which are temperature sensitive, such as crosslinking agents, crosslinking accelerators and retardants, activating agents.

The second extruder (20) may be also provided with gravimetrically controlled feeding pumps (27) to introduce into the extruder (20) additional plasticizing oils or other liquid ingredients, such as liquid resins (e.g. phenolic resins) and anti-reversion agents (e.g. silanes).

The final rubber mixture is discharged from the second extruder (20) through a die (28). Analogously to the first production phase, the final rubber mixture may be optionally filtered to eliminate possible aggregates, metal particles or other impurities. Therefore, a filtering body (29) (e.g. a screen filter) and a gear pump (30) may be placed before the die (28). During this optional filtering phase of the completed rubber mixture, particular care should be taken to avoid temperature raising which could cause scorching of the rubber.

The pneumatic conveying lines (16, 25) are connected to a pneumatic conveying system (not represented in the figures) which may be implemented according to techniques well known in the art. In general terms, a pneumatic conveying system is able to transport a subdivided product through a pipeline using the motive force of air (or any other gas) under a positive or negative pressure.

A pneumatic conveying system suitable for the present invention may operate in "dilute phase" or in "dense phase", namely with a low filling factor or with a high filling factor of the pneumatic line. In the case of a dilute phase conveying system, the product to be transported is suspended in the air stream and the conveying velocity is high (usually from 15 to 40 m/sec), while in a dense phase system the product slides through the pipeline rather than particles being fully suspended in the air stream, and the conveying velocity is low (usually not higher than 5-10 m/sec).

The pneumatic conveying system usually comprises a blower or a fan to deliver air into the pipeline (in the case of a positive pressure) or to suck air from the pipeline (in the case of a negative pressure), a feed device to entrain the product into the conveying air (e.g. a rotary valve) and a filter or air separator to remove the product from the air at the receiving device (e.g. a feed hopper). For a survey on pneumatic conveying systems, see for instance the paper "Recent Developments In Pneumatic Conveying" by R. L. Serpan, presented at the PCA/MTC Technical Session (Sep. 22, 1998, Banff, Alberta Canada).

The process according to the present invetion may be employed to produce rubber mixture of any kind of elastomers, particularly of elastomers used in the tyre industry. Generally, the elastomeric base may be selected from: diene elastomeric polymers and mono-olefin elastomeric polymers, or mixtures thereof.

Diene elastomeric polymers are generally of natural origin, or may be obtained by polymerization, in solution or in emulsion, of at least one conjugated diolefin, optionally with at least one monovinylarene in an amount not exceeding 50% by weight. Examples of diene elastomeric polymers are: cis-1, 4-polyisoprene (either natural or synthetic, preferably natural rubber), 3,4-polyisoprene, poly-1,3-butadiene (in particular, high vinyl poly-1,3-butadiene having a content of 1,2-polymerized units of from 15% to 85% by weight), polychloroprene, optionally halogenated isoprene/isobutene copolymers, 1,3-butadiene/acrylonitrile copolymers, 1,3-butadiene/styrene copolymers, 1,3-butadiene/isoprene copolymers, isoprene/styrene copolymers, isoprene/1,3-butadiene/styrene terpolymers; or mixtures thereof.

As to mono-olefin elastomeric polymers, they may be selected from: copolymers of ethylene with at least one alpha-olefin having from 3 to 12 carbon atoms, and optionally with a diene having from 4 to 12 carbon atoms; polyisobutene; copolymers of isobutene with at least one diene. Particularly preferred are: ethylene/propylene copolymers (EPR); ethylene/propylene/diene terpolymers (EPDM); polyisobutene; butyl rubbers; halobutyl rubbers; or mixtures thereof.

The rubber mixture further comprises at least one reinforcing filler, such as: carbon black, silica, alumina, aluminosilicates, calcium carbonate, kaolin, titanium dioxide, or mixtures thereof. Particularly preferred are carbon black and silica, or mixtures thereof. The amount of the reinforcing filler may be generally of from 0.1 to 120 phr, preferably from 20 to 90 phr (phr=parts by weight per 100 parts by weight of elastomeric base).

To improve processability, at least one plasticizing agent is preferably added to the rubber mixtures. It is generally selected from mineral oils, vegetable oils, synthetic oils and the like, or mixtures thereof, for instance: aromatic oil, naphthene oil, phthalates, soybean oil, or mixtures thereof. The amount of the plasticizing agent may generally range from 2 to 100 phr, preferably from 5 to 50 phr.

The present invention is now further illustrated by the following working examples.

Preparation of Minor Ingredients in the Granular Form.

Some minor ingredients were produced in the granular form, by mixing each minor ingredient with the binding agent in a co-rotating twin-screw extruder. The extruded material, in the form of "spaghetti", was cooled in a water bath, dried with an air flow and chopped, so as to obtain granules having the following dimensions: about 2 mm diameter, about 3 mm length.

The compositions of the different granules are reported in Table 1 (the percentages are expressed by weight with respect to the total weight of the granules).

TABLE 1

| Ingredient | Binding agent |
|---|---|
| Stearic Acid (70%) | Engage ® 8200 (20%) Carbon black N660 (10%) |
| ZnO (85%) | Engage ® 8150 (7.5%) Vestenamer ® 8012 (7.5%) |
| Wax (50%) | Engage ® 8200 (30%) Carbon black N660 (20%) |
| N-cycloexylmercaptobenzothiazylsulphenamide (CBS) (70%) | Engage ® 8150 (30%) |
| N-tertbutyl-mercaptobenzothiazyl sulphenamide (TBBS) (70%) | Engage ® 8150 (30%) |
| N,N-dicycloexylmercaptobenzothiazyl sulphenamide (DCBS) (70%) | Engage ® 8150 (30%) |
| Insoluble sulfur ($S_n$) (76.5%) | Engage ® 8150 (15%) Paraffin Oil (8.5%) |
| Insoluble sulfur ($S_n$) + N-cyclohexyl thiophtaloimide (PVI) (6:1 wt) (79%) | Engage ® 8150 (15%) Paraffin Oil (6%) |
| Diphenyl guanidine (DPG) (70%) | Engage ® 8150 (30%) |

Engage ® 8200 (by Du Pont-Dow Elastomers): ethylene/1-octene copolymer obtained by metallocene catalysis having the following characteristics: ethylene/1-octene weight ratio = 76/24; density = 0.870 g/cm³; MFI = 0.5 g/10', $\Delta H_m$ = 24 J/g; $T_m$ = 60° C.
Engage ® 8150 (by Du Pont-Dow Elastomers): ethylene/1-octene copolymer obtained by metallocene catalysis having the following characteristics: ethylene/1-octene weight ratio = 75/25; density = 0.868 g/cm³; MFI = 0.5 g/10', $\Delta H_m$ = 34.8 J/g; $T_m$ = 59.2° C.

Example 1

A rubber mixture was prepared by means of an apparatus with a configuration as illustrated in FIGS. 1a and 1b, using natural rubber (NR) as elastomeric base and carbon black as reinforcing filler. The composition of the rubber mixture is reported in Table 2 (the values reported in the table refer to the amount of active ingredient, without taking into account the binding agent).

To prepare the intermediate rubber mixture, a co-rotating intermeshing twin screw extruder was employed, having a cylinder diameter of 58 mm and a L/D ratio of 48. The NR was first granulated using a rotating blades mill, to an average particle size about 1 cm, and dusted with silica in order to prevent reagglomeration. The granulated NR was fed through the main hopper of the extruder, together with carbon black. Through the same hopper, ZnO and stearic acid were fed in the form of granules, whose compositions are reported in Table 1. Each granular ingredient was fed using a dedicated gravimetric feeder; the reservoir refill of the feeders was carried out by means of the pneumatic conveying lines, as represented in FIG. 1a. Aromatic oil was injected into the extruder through the second hopper. The temperature of the extruded material was 167° C.

The intermediate rubber mixture extruded in the first stage was granulated and dusted with silica, then fed through the main hopper of a second 58 mm extruder (L/D=48). The curatives (insoluble sulfur and N,N-dicycloexyl mercaptobenzothiazyl sulphenamide (DCBS)), were fed through the main hopper of the second extruder in the form of granules, whose composition is reported in Table 1. Each granular ingredient was fed using a dedicated gravimetric feeder; the reservoir refill of the feeders was carried out by means of the pneumatic conveying lines, as represented in FIG. 1b. The protective agent (N-(1,3-dimethyl)butyl-N'-phenyl-p-phenylendiamine) was injected into the second extruder in the molten state by means of a feeding pump. The temperature of the extruded material was 117° C.

The Mooney viscosity ML(1+4) at 100° C. of the so obtained rubber mixture was measured according to Standard ISO 289/1. The mechanical properties (according to ISO standard 37) and the hardness in IRHD degrees at 23° C. and 100° C. (according to ISO standard 48) were measured on samples of the composition cross-linked at 170° C. for 10 minutes. The results are shown in Table 3.

Table 3 also shows the dynamic elastic properties, measured with a dynamic Instron device an the traction-compression mode according to the following method. A test piece of the cross-linked material having a cylindrical form (length=25 mm; diameter=14 mm), compression-preloaded up to a 10% longitudinal deformation with respect to the initial length, and kept at the prefixed temperature (70° C. or 23° C.) for the whole duration of the test, was submitted to a dynamic sinusoidal strain having an amplitude of ±3.33% with respect to the length under pre-load, with a 100 Hz frequency. The dynamic elastic properties are expressed in terms of dynamic elastic modulus (E') and tandelta (loss factor) values. As is known, the tandelta value is calculated as a ratio between the viscous modulus (E") and the elastic modulus (E'), both of them being determined with the above dynamic measurements.

TABLE 2

| Ingredients | phr |
|---|---|
| First stage | |
| Natural Rubber (STR 20) | 100 |
| Carbon Black N375 | 60 |
| Aromatic Oil | 7 |
| Zinc Oxide* | 3.5 |
| Stearic Acid* | 2 |
| Second stage | |
| DCBS* | 1.3 |
| Sulfur* | 2 |
| 6PPD | 2 |
| Total parts | 177.8 |

*fed in the granular form

TABLE 3

| Test | Value |
|---|---|
| Viscosity ML(1 + 4) @100° C. | 71.3 |
| 100% Modulus (MPa) | 1.54 |
| 300% Modulus (MPa) | 8.33 |
| Stress at break (MPa) | 18.15 |
| Elongation at break (%) | 517.5 |
| E' @23° C. (MPa) | 3.91 |
| E' @70° C. (MPa) | 3.13 |
| Tandelta @23° C. | 0.174 |
| Tandelta @70° C. | 0.135 |
| IRHD Hardness @23° C. | 56 |
| IRHD Hardness @100° C. | 49 |

Example 2

A rubber mixture was prepared by means of an apparatus with a configuration as illustrated in FIGS. 1a and 1b, using a mixture of styrene/butadiene copolymer (SBR) and polybutadiene (BR) as elastomeric base and silica as reinforcing filler. The composition of the rubber mixture is reported in Table 4 (the values reported in the table refer to the amount of active ingredient, without taking into account the binding agent).

To prepare the intermediate rubber mixture, a co-rotating intermeshing twin screw extruder was employed, having a cylinder diameter of 58 mm and a L/D ratio of 48. The SBR and BR were first granulated using a rotating blades mill, to an average particle size about 1 cm, and dusted with silica in order to prevent reagglomeration, then a physical blend of the so obtained crumbs was made. The blend of the granulated rubbers was fed through the main hopper of the extruder, together with silica. Through the same hopper, wax and stearic acid were fed in the form of granules, whose compositions are reported in Table 1. Each granular ingredient was fed using a dedicated gravimetric feeder; the reservoir refill of the feeders was carried out by means of the pneumatic conveying lines, as represented in FIG. 1a. As coupling agent for silica, the commercial product X50S by Degussa was used (consisting of 50% by weight of bis(3-triethoxysilylpropyl) tetrasulfide and 50% by weight of carbon black).

Aromatic oil was injected into the extruder through the second hopper. The temperature of the extruded material was 150° C.

The intermediate rubber mixture extruded in the first stage was granulated and dusted with silica, then fed through the main hopper of a second 58 mm extruder (L/D=48). The curatives (insoluble sulfur, N-cycloexyl mercapto-benzothiazyl sulphenamide (CBS) and diphenyl guanidine (DPG)), were fed through the main hopper of the second extruder in the form of granules, whose composition is reported in Table 1. Each granular ingredient was fed using a dedicated gravimetric feeder; the reservoir refill of the feeders was carried out by means of the pneumatic conveying lines, as represented in FIG. 2. The protective agent (N-(1,3-dimethyl)butyl-N'-phenyl-p-phenylendiamine) was injected into the second extruder in the molten state by means of a feeding pump. The temperature of the extruded material was 128° C.

The so obtained rubber mixture was characterized as reported in Example 1. The results are shown in Table 5.

TABLE 4

| Ingredients | phr |
|---|---|
| *First stage* | |
| s-SBR (JSR HP-752) | 70 |
| BR (Buna ® Cis-132) | 30 |
| Silica (Zeosil ® 1165) | 65 |
| Aromatic Oil | 7 |
| Coupling agent | 10 |
| Wax* | 1.5 |
| Stearic Acid* | 2 |
| *Second stage* | |
| Zinc Oxide* | 2.5 |
| DPG* | 1 |
| CBS* | 2 |
| Sulfur* | 1.2 |
| 6PPD | 2 |
| Total parts | 194.2 |

*fed in the granular form

TABLE 5

| Test | Value |
|---|---|
| Viscosity ML(1 + 4) @100° C. | 80.1 |
| 100% Modulus (MPa) | 2.90 |
| 300% Modulus (MPa) | 12.88 |
| Stress at break (MPa) | 18.26 |
| Elongation at break (%) | 439.1 |
| E' @23° C. (MPa) | 10.78 |
| E' @70° C. (MPa) | 7.15 |
| Tandelta @23° C. | 0.299 |
| Tandelta @70° C. | 0.137 |
| IRHD Hardness @23° C. | 76 |
| IRHD Hardness @100° C. | 69 |

Example 3

A rubber mixture was prepared by means of an apparatus with a configuration as illustrated in FIGS. 1a and 1b, using a mixture of natural rubber (NR) and polybutadiene (BR) as elastomeric base and carbon black as reinforcing filler. The composition of the rubber mixture is reported in Table 6 (the values reported in the table refer to the amount of active ingredient, without taking into account the binding agent).

To prepare the intermediate rubber mixture, a co-rotating intermeshing twin screw extruder was employed, having a cylinder diameter of 58 mm and a L/D ratio of 48. The NR and BR were first granulated using a rotating blades mill, to an average particle size about 1 cm, and dusted with silica in order to prevent reagglomeration, than a physical blend of the so obtained crumbs was made. The blend of the granulated rubbers was fed through the main hopper of the extruder, together with carbon black. Through the same hopper, zinc oxide, wax and stearic acid were fed in the form of granules, whose compositions are reported in Table 1. Each granular ingredient was fed using a dedicated gravimetric feeder; the reservoir refill of the feeders was carried out by means of the pneumatic conveying lines, as represented in FIG. 1a. The temperature of the extruded material was 146° C.

The intermediate rubber mixture extruded in the first stage was granulated and dusted with silica, then fed through the main hopper of a second 58 mm extruder (L/D=48). The curatives (insoluble sulfur+N-cyclohexyl thiophtalimide (PVI) and N-tertbutyl-mercaptobenzothiazyl sulphenamide (TBBS)), were fed through the main hopper of the second extruder in the form of granules, whose composition is reported in Table 1. Each granular ingredient was fed using a dedicated gravimetric feeder; the reservoir refill of the feeders was carried out by means of the pneumatic conveying lines, as represented in FIG. 1b. The protective agent (N-(1,3-dimethyl)butyl-N'-phenyl-p-phenylendiamine) was injected into the second extruder in the molten state by means of a feeding pump. The temperature of the extruded material was 128° C.

The so obtained rubber mixture was characterized as reported in Example 1. The results are shown in Table 7.

TABLE 6

| Ingredients | phr |
|---|---|
| *First stage* | |
| Natural Rubber (STR 20) | 50 |
| BR (Buna ® Cis-132) | 50 |
| Carbon Black N660 | 50 |
| Zinc Oxide* | 3 |
| Wax* | 2 |
| Stearic Acid* | 2 |
| *Second stage* | |
| TBBS* | 0.8 |
| Sulfur* | 1.8 |
| PVI* | 0.3 |
| 6PPD | 2.5 |
| Total parts | 162.4 |

*fed in the granular form

TABLE 7

| Test | Value |
|---|---|
| Viscosity ML(1 + 4) @100° C. | 65.2 |
| 100% Modulus (MPa) | 2.08 |

TABLE 7-continued

| Test | Value |
| --- | --- |
| 300% Modulus (MPa) | 8.92 |
| Stress at break (MPa) | 14.18 |
| Elongation at break (%) | 459.0 |
| E' @23° C. (MPa) | 5.30 |
| E' @70° C. (MPa) | 4.28 |
| Tandelta @23° C. | 0.142 |
| Tandelta @70° C. | 0.111 |
| IRHD Hardness @23° C. | 61 |
| IRHD Hardness @100° C. | 58 |

The invention claimed is:

1. A process for continuously producing an elastomeric composition, comprising:
 providing at least one extruder;
 metering and feeding at least one elastomer into the at least one extruder;
 metering and feeding at least one filler into the at least one extruder;
 wherein the metering and feeding of the at least one elastomer is separate from the metering and feeding of the at least one filler;
 metering and feeding at least one ingredient different from said at least one elastomer and said at least one filler into the at least one extruder;
 mixing and dispersing the at least one filler and the at least one ingredient different from said at least one elastomer and said at least one filler into the at least one elastomer using the at least one extruder; and
 extruding a resulting elastomeric composition through a discharge opening of a housing of the at least one extruder;
 wherein the at least one extruder comprises:
  the housing; and
  at least one screw rotatably mounted in the housing;
 wherein the housing comprises:
  at least one feed opening; and
  the discharge opening;
 wherein at least one of said at least one ingredient different from said at least one elastomer and said at least one filler comprises a subdivided product comprising one or more minor ingredients dispersed in at least one thermoplastic binding agent,
 wherein the at least one thermoplastic binding agent comprises:
  a copolymer of ethylene with at least one aliphatic or aromatic alpha-olefin, and, optionally, with at least one polyene; and
  a molecular weight distribution index (MWD) less than 5, and
 wherein the subdivided product contains greater than 70%-by-weight and less than 98%-by-weight of the one or more minor ingredients with respect to the total weight of the subdivided product and is conveyed, before metering and feeding into the at least one extruder, by at least one pneumatic conveying line, and
 wherein said one or more minor ingredients are selected from crosslinking agents, crosslinking accelerators, and crosslinking retardants; and are to be used during the crosslinking of a product comprising the elastomeric composition.

2. The process of claim 1, further comprising:
 metering and feeding at least one plasticizing agent into the at least one extruder.

3. The process of claim 1, wherein the subdivided product is metered and fed using a gravimetric feeder.

4. The process of claim 1, wherein the subdivided product comprises greater than 70%-by-weight and less than 95%-by-weight of the one or more minor ingredients with respect to a total weight of the subdivided product.

5. The process of claim 1, wherein the subdivided product comprises greater than 70%-by-weight and less than 85%-by-weight of the one or more minor ingredients with respect to a total weight of the subdivided product.

6. The process of claim 1, wherein the subdivided product comprises a Shore A hardness greater than or equal to 45 and a Shore D hardness less than or equal to 65.

7. The process of claim 6, wherein the subdivided product comprises a Shore D hardness greater than 20 and less than 60.

8. The process of claim 1, wherein said subdivided product further comprises one or more:
 synthetic resins;
 adhesion promoters;
 protective agents;
 coupling agents; and/or
 condensation catalysts.

9. The process of claim 1, further comprising:
 providing first and second extruders;
 wherein the first extruder extrudes an intermediate rubber mixture devoid of temperature sensitive minor ingredients, and
 wherein the second extruder extrudes a complete rubber mixture comprising the temperature sensitive minor ingredients.

10. The process of claim 1, wherein the at least one thermoplastic binding agent comprises a melting temperature ($T_m$) greater than or equal to 40° C.

11. The process of claim 1, wherein the at least one thermoplastic binding agent comprises a melting temperature ($T_m$) greater than 50° C. and less than 120° C.

12. The process of claim 1, wherein the at least one thermoplastic binding agent has a molecular weight distribution index (MWD) greater than 1.5 and less than 3.5.

13. The process of claim 1 or 12, wherein the copolymer is obtained by copolymerization of ethylene with an aliphatic or aromatic alpha-olefin and optionally, a polyene, in a presence of a single-site catalyst.

14. The process of claim 1, wherein the at least one thermoplastic binding agent is in admixture with at least one elastomeric polymer comprising a glass transition temperature ($T_g$) less than 20° C.

15. The process of claim 1, wherein the at least one thermoplastic binding agent is in admixture with at least one reinforcing filler.

16. The process of claim 1, wherein the at least one thermoplastic binding agent is in admixture with at least one plasticizing agent.

17. The process of claim 1, wherein the copolymer of ethylene with at least one aliphatic or aromatic alpha-olefin, and, optionally, with at least one polyene, is an ethylene-1-octene copolymer.

* * * * *